United States Patent [19]

Buhri et al.

[11] Patent Number: 4,915,561

[45] Date of Patent: Apr. 10, 1990

[54] FASTENING ELEMENT ASSEMBLY WITH A DEFORMABLE SLEEVE

[75] Inventors: Reinhard Buhri, Frastanz, Austria; Elmer C. Hoepker, Planken, Liechtenstein; Elmar Thurner, Feldkirch, Austria; Alfred Tobler, Erlen, Switzerland

[73] Assignee: Hilti Aktiengesellschaft

[21] Appl. No.: 286,329

[22] Filed: Dec. 19, 1988

[30] Foreign Application Priority Data

Dec. 18, 1987 [DE] Fed. Rep. of Germany ....... 3743049

[51] Int. Cl.⁴ ............................................. F16B 15/00
[52] U.S. Cl. ..................................... 411/439; 411/441
[58] Field of Search ............... 411/441, 107, 480, 103, 411/372, 374, 265, 266, 267, 268, 269, 270, 383, 380, 440, 482, 544, 492, 439, 532, 371, 546

[56] References Cited

U.S. PATENT DOCUMENTS

| | | | |
|---|---|---|---|
| 2,660,084 | 11/1953 | Dewman | 411/522 |
| 3,315,720 | 4/1967 | Gutshall | 411/544 |
| 3,324,542 | 6/1967 | Hilti | 411/441 X |
| 3,377,903 | 4/1968 | Korte | 411/441 |
| 3,382,751 | 5/1968 | Kopf | 411/439 |
| 3,921,495 | 11/1975 | Braum et al. | 411/441 |
| 3,978,759 | 9/1976 | Bakoledis | 411/441 |
| 4,102,238 | 7/1978 | Thurner | 411/441 |
| 4,802,802 | 2/1989 | Thurner | 411/107 |

FOREIGN PATENT DOCUMENTS

| | | | |
|---|---|---|---|
| 205826 | 2/1957 | Australia | 411/441 |
| 1500868 | 5/1972 | Fed. Rep. of Germany . | |
| 2504816 | 8/1975 | Fed. Rep. of Germany | 411/441 |
| 603494 | 1/1926 | France | 411/544 |
| 64554 | 6/1955 | France | 411/441 |
| 1290093 | 2/1962 | France | 411/441 |

*Primary Examiner*—Rodney M. Lindsey
*Attorney, Agent, or Firm*—Toren, McGeady & Associates

[57] ABSTRACT

A fastening element assembly is made up of a nail-like fastening element and a deformable sleeve displaceably secured on the fastening element shank. The assembly is used to secure sheet metal plates to a base material of variable strength. At its leading end the sleeve has an outwardly extending flange. When the assembly is driven into a receiving material or base, the sleeve is displaced in the rearward direction along the shank toward the trailing head on the fastening element. The shank widens conically toward the head. As the sleeve is displaced rearwardly, it is radially expanded. When the trailing end of the sleeve contacts the head, the sleeve collapses or is deformed in the axial direction in the manner of an accordian. Excess energy applied to the assembly during the driving step is converted into deformation work acting on the sleeve.

11 Claims, 1 Drawing Sheet

FASTENING ELEMENT ASSEMBLY WITH A DEFORMABLE SLEEVE

BACKGROUND OF THE INVENTION

The invention is directed to a fastening element assembly including a nail-like fastening element to be driven into a base or receiving material by an explosive powder charge operated driving device. The fastening element has a tip at its leading end, a head at its opposite end with a shank extending from the tip to the head.

Nail-like fastening elements are driven into a hard underlying base or receiving material, such as concrete, steel and the like, by means of an explosive powder charge operated driving device. A problem with this type of fastening element is the varying resistance to penetration of the base or receiving material. In the past, powder charges of various strengths have been used, as well as means in the fastening element for regulating the driving output, and in addition, the driving-in capacity of the driving device can, to some extent be adapted to the prevailing conditions. Due to irregularities in and variable strength of the base or receiving material, the required driving in energy in a given region can vary sharply.

Various means are known for achieving a secure attachment of a construction part on a receiving material with different penetration depths of the fastening element. Thus, for example, in the solution disclosed in DE-PS 1 500 868, a guidance sleeve with a flange at its leading end is positioned on the shank of the fastening element. When the fastening element is being inserted, the flange contacts the surface of the construction part to be secured. When the nail-like fastening element is driven in, the sleeve is displaced toward the head on the shank and, subsequently, is upset to some degree in the manner of an accordion. With such a fastening element, however, it is possible during unexpectedly high penetration resistance that the fastening element is not driven in by a sufficient amount, whereby the rear end of the sleeve does not contact the head. In such a situation, a sufficient attachment of the construction part is not insured, since the sleeve cannot be displaced axially on the shank of the fastening element.

SUMMARY OF THE INVENTION

Therefore, it is the primary object of the present invention to provide a fastening element assembly incorporating a nail-like fastening element capable of a secure attachment of a construction part to a base or receiving material where the fastening element achieves different penetrating depths.

In accordance with the present invention, the object is achieved by a combination of the following features:
(a) the fastening element shank widens conically from its tip toward its head; and
(b) an axially deformable sleeve with a flange at the tip end of the fastening element is arranged on the fastening element shank spaced axially from the head.

The shank, which widens conically from the tip to the head of the fastening element, effects a radial expansion of the sleeve as the sleeve is displaced axially toward the head. As a result, a portion of any excess energy possibly present is converted into deformation work before the sleeve reaches the head. Further, due to the conical shape of the shank, the sleeve is secured against displacement on the shank in various positions. When the penetration depth of the fastening element is reached, the sleeve is deformed by collapsing in the axial direction as it bears against the fastening element head, collapsing in the manner of an accordion. The flange located at the leading end of the sleeve at the tip end of the fastening element, serves to guide the fastening element in the driving device and, in addition, forms a relatively large supporting surface for the fastening element assembly at the construction part to the attached. Such a feature is particularly advantageous when fastening thin sheet metal plates, since passage of the assembly through the sheet metal plate is prevented.

The inside diameter at the trailing end of the sleeve corresponds approximately to the diameter of an axially extending portion of the shank spaced between the tip and the head. Accordingly, the sleeve can be held on the shank and connected to the fastening element without any additional means. The inside diameter of the sleeve can be uniform along its full axial length or can be somewhat reduced at the trailing end relative to the rest of its axial length. With a region of the trailing end of the sleeve reduced in diameter, a defined contact of the sleeve with the shank and, accordingly, a relatively accurately defined displacement resistance is achieved. When the fastening element is being driven in, according to the invention, the construction part to be attached, is pressed against the receiving material by the flange on the sleeve. As a result, the developed contact pressures can be very high. When thin sheet metal plates are being attached to a receiving material, there is the risk that the fastening element may punch through the plates. To avoid such an occurrence, the flange on the sleeve is curved outwardly so that its leading face is convex and its trailing face concave in the manner of an opened umbrella so that the opening or recess formed by the flange faces the head of the fastening element. With the convex curvature of the flange facing the construction part, no sharp edges come into contact with the part to be attached. Further, the curved configuration the flange affords a good support when the fastening element is driven through the construction part to be attached so that it diverges somewhat from a perpendicular position relative to the outer surface. During the insertion step, the sleeve is supported by the flange on the construction part to be attached, while the nail-like fastening element is driven into the receiving material passing through the sleeve and the construction part. Accordingly, due to the conical shape of the shank, a force component is produced which presses the construction part to be attached against the receiving material. To assure that the pressing action forcing the construction part against the receiving material is effected at the commencement of the driving in step, it is advisable that the tip of the fastening element is flush with the most forward part of the flange on the sleeve. Therefore, the construction part is pressed against the receiving material by the sleeve at the same time that the fastening element is driven through the construction part to be attached. With the most forward part of the flange being flush with the tip of the fastening element, the tip is protected and the driving device operator is protected from injury by the fastening element.

When sliding the sleeve relative to the shank, with the shank widening conically toward the head, the sleeve is expanded radially. As a result, a portion of the driving in energy is converted into deformation work. The ideal portion of the deformation work occurs when the conicity of the shank is advangateously in the range of 2% to 15%, and preferably 5% to 10%. This range of conicity corresponds approximately to a cone angle of approximately 1.5° to 3°. Such conicity does not reduce the anchoring coefficient of the fastening element in the receiving material.

To increase the extraction coefficient, it is advantageous to knurl at least an axially extending portion of the shank. The knurling increases the holding coefficient of the sleeve on the shank and the resistance during displacement of the sleeve on the shank region provided with the knurling.

Preferably, the shank has at least two axially extending regions of different conicity. In this manner, the conicity of the region trailing in the driving in direction, that is, closer to the head of the fastening element, is greater in each instance. As a result, during the driving in step, the sleeve is displaced axially on the region of lesser conicity and subsequently slides in the axial region of greater conicity. When the sleeve is displaced or slid in the region of greater conicity, a relatively strong deformation of the sleeve is effected and excess energy which may be present is dissipated.

When the penetration depth is reached, the sleeve is relatively intensively deformed or collapsed in the manner of an accordion. Preferably, the sleeve is formed of metal so that it is not destroyed during deformation. Particularly, steel is a suitable metal for the sleeve. Sleeves, however, may be formed of light metal alloys or nonferrous materials.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a view similar to FIG. 1, however, the fastening element has been completely driven in.

DETAILED DESCRIPTION OF THE INVENTION

Figure 1:
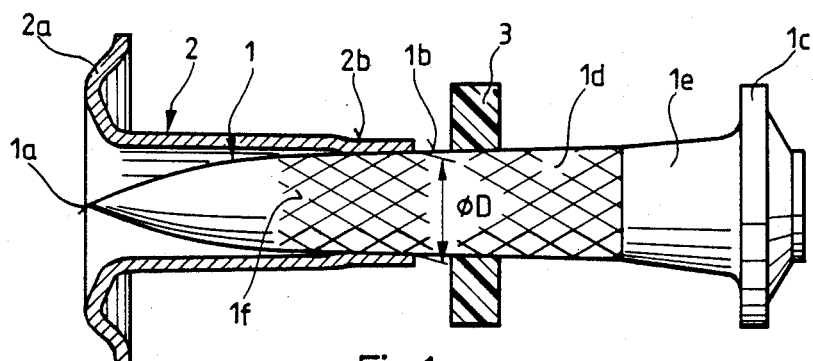
FIG. 1 is a side view, partly in section, of a fastening element assembly, embodying the present invention, before the fastening element is driven into a receiving material.
Figure 2:
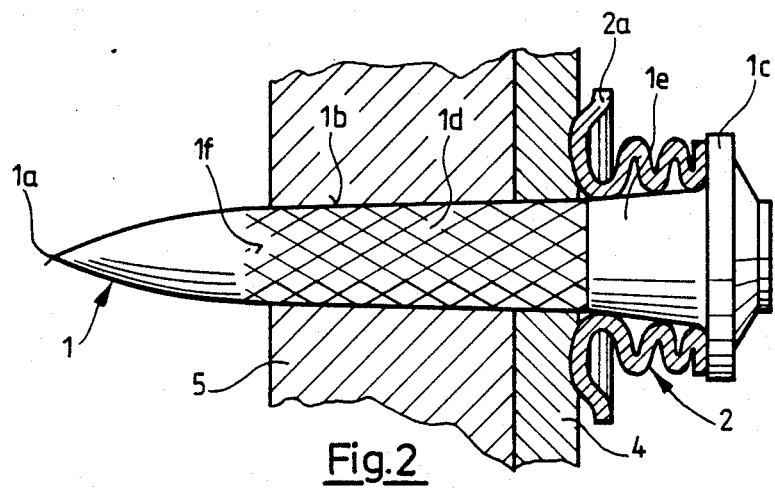
Figure 3:
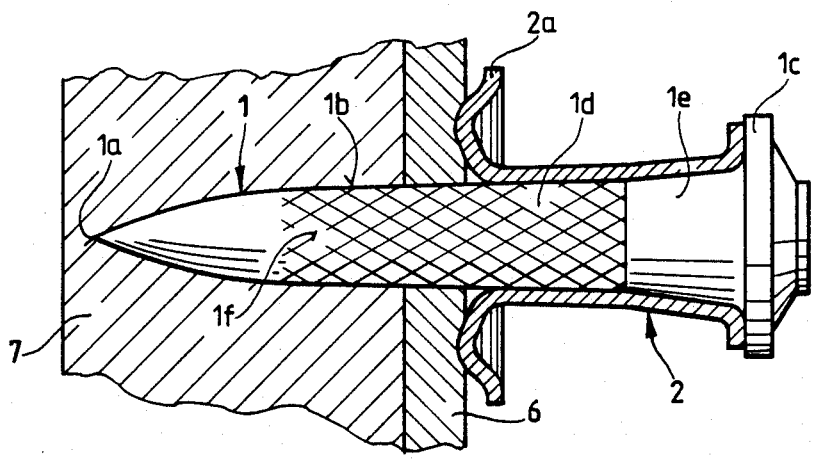
FIG. 3 is another view of the fastening element assembly of FIG. 1, in a partially driven in state.

The fastening element assembly illustrated in FIGS. 1 to 3 includes an axially extending fastening element or nail 1 with a pointed tip 1a at its leading end, a head 1c at its trailing end and a shank 1b extending between the tip and the head. As viewed in the drawing, the driving in direction is toward the left. In addition, an axially extending sleeve 2 is displaceably secured on the shank 1b. Shank 1b of the nail 1 widens conically from the tip 1a toward the head 1c and is divided into two axially extending regions 1d, 1e, each having a different conicity. The leading region 1d has a knurled surface 1f. The knurled surface 1f increases the extraction coefficient of the fastening element when it is driven into a receiving material or base, preferably consisting of steel. At its lead end, the sleeve has an annular flange 2a extending outwardly from the sleeve. As can be noted in FIG. 1, the flange 2a curves outwardly and has a convex leading surface facing in the driving in direction and a concave trailing surface facing toward the head 1c so that the trailing surface is shaped in the manner of an umbrella with a recess facing toward the head 1c. This configuration of the flange 2a prevents a construction part, to be attached to the receiving material, from being punched through or damaged by the flange. Adjacent its trailing end, the sleeve is deformed inwardly with a taper 2b into contact with the surface of the shank 1b. The inside diameter D, at the trailing end of the sleeve, corresponds approximately to the diameter of the central axially extending portion of the shank 1b of the nail 1. A guide member 3 for guiding the fastening element assembly in an explosive powder charge operated driving device, not shown, is positioned on the leading region 1d of the nail shank 1b spaced from the trailing end of the sleeve 2. Preferably, the guide member is formed of a plastics material and is destroyed during the driving in operation. The sleeve 2 is positioned on the nail 1, so that its leading face on the flange is flush with the tip 1a of the nail 1. In other words, the most forward portion of the leading surface is located in a transverse plane perpendicular to the axis of the nail and excluding the pointed tip 1a.

In FIG. 2, the fastening element or nail 1 of the fastening element assembly is driven into a receiving material or base 5 passing through a construction part 4, such as a sheet metal plate, to be attached to the base. In the driving in step, the tip 1a of the nail 1 passes through the base 5 and projects out of the base on the opposite side from the construction part 4. As the nail is driven in, the sleeve 2 is displaced along the shank 1b, toward the head 1c, moving relative to the nail. Initially, sleeve 2 is radially expanded by the shank 1b and widens conically as it moves toward the head 1c. When the trailing end of the sleeve 2 contacts the head 1c, the sleeve is axially deformed or collapsed in the manner of a bellows. The radially outer edge of the flange 2a, curved relatively in the manner of an umbrella, does not contact the construction part 4 to be attached. Accordingly, any damage to surface coatings on the construction part to be attached are avoided due to the configuration of the flange as the fastening element assembly is driven. With the sleeve 2 supported at its trailing and against the head 1c and at its leading end with the flange contacting the surface of the construction part 4, an effective seal is provided for the fastening element assembly.

In FIG. 3, the fastening element assembly is inserted with a low driving in energy or it is driven into a base 7 with a high penetration resistance. Accordingly, nail 1 is only partially driven into the base 7. Sleeve 2 presses the construction part 6 to be attached to the base, against the base 7 by means of its flange 2a. The sleeve is displaced along the shank 1b of the nail 1, however, only until its trailing end contacts the head 1c. The sleeve 2 fits securely on the shank 1b due to the conical configuration of the shank and prevents disengagement of the construction part 6 from the base 7. In accordance with the present invention, the fastening element assembly provides a secure attachment of the construction part to the base regardless of the extent of penetration of the nail 1 into the base.

While specific embodiments of the invention have been shown and described in detail to illustrate the application of the inventive principles, it will be understood that the invention may be embodied otherwise without departing from such principles.

We claim:

1. Fastening element assembly such as used with an explosive powder charge operated driving device, comprising an axially extending nail-like fastening element having a leading end to be driven first into a receiving material and a trailing end, said fastening element having a pointed tip at the leading end and an outwardly projecting head at the trailing end with a shank extending between said tip and said head, wherein the improvement comprises that said shank widens conically from said tip toward said head, and an axially extending and axially deformable sleeve having a leading end and a trailing end with an annular flange extending radially outwardly transversely of the fastening element axis at the leading end thereof adjacent said tip and a tubular section extending axially from a radially inner edge of said flange toward and spaced from said head, an axially extending part of said tubular section of said sleeve is displaceably secured on said shank at an axially extending location on said shank spaced between said tip and said head.

2. Fastening element assembly, as set forth in claim 1, wherein said tubular section of said sleeve has an inside diameter at the trailing end thereof corresponding approximately to the diameter of said axially extending location of said shank intermediate the tip and head.

3. Fastening element assembly, as set forth in claim 1, wherein said flange has a leading surface facing in the direction in which the fastening element is to be driven into a receiving material and a trailing surface facing toward the head of said fastening element, said leading surface being convex and said trailing surface being concave so that said flange curves radially outwardly from said tip in the manner of an umbrella with an annularly shaped opening directed toward the head of said fastening element.

4. Fastening element assembly, as set forth in claim 3, wherein said tip of said fastening element is located in a transverse plane containing a part of the convex leading surface of said flange spaced most remotely from said head.

5. Fastening element assembly, as set forth in claim 1, wherein said shank has a conicity in the range of 2% to 15%.

6. Fastening element assembly, as set forth in claim 5, wherein said shank has a conicity in the range of 5% to 10%.

7. Fastening element assembly, as set forth in claim 1, wherein said shank has an axially extending knurled portion for a part of the axial length thereof spaced from said tip and head.

8. Fastening element assembly, as set forth in claim 1, wherein said shank has at least two axially extending regions each have a different conicity.

9. Fastening element assembly, as set forth in claim 8, wherein said axially extending region of said shank closer to said head has a greater conicity than the axially extending region of said shank closer to said tip.

10. Fastening element assembly, as set forth in claim 1, wherein said sleeve is formed of a metal.

11. Fastening element assembly, as set forth in claim 1, wherein a guiding member is positioned on said shank between said sleeve and said head for guiding the fastening element assembly when driven from the driving device.

* * * * *